Jan. 3, 1956 — O. MITCHELL — 2,729,068
COMBINATION LIQUID FUEL VAPORIZER AND STORAGE TANK
Filed Jan. 30, 1952
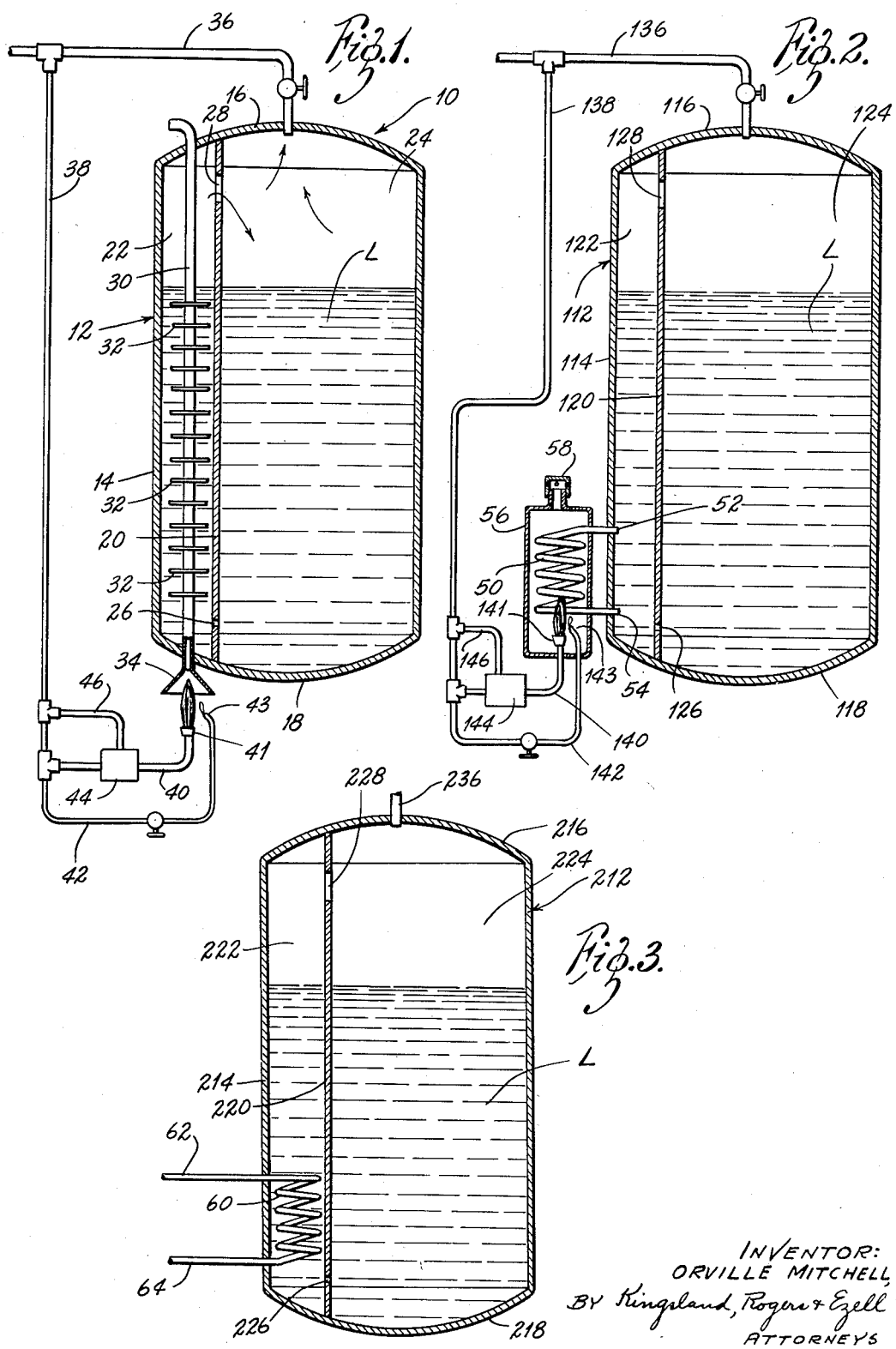
INVENTOR:
ORVILLE MITCHELL,
BY Kingsland, Rogers & Ezell
ATTORNEYS

United States Patent Office 2,729,068
Patented Jan. 3, 1956

2,729,068
COMBINATION LIQUID FUEL VAPORIZER AND STORAGE TANK

Orville Mitchell, Dallas, Tex., assignor to John E. Mitchell Company, Dallas, Tex., a corporation of Missouri Application January 30, 1952, Serial No. 269,018

7 Claims. (Cl. 62—1)

The present invention relates generally to the vaporization and storage of liquid hydrocarbon fuel and more particularly to a novel combination liquid fuel vaporizer and storage tank.

In the combination vaporizer and storage tanks in use at the present time, heat is supplied to the entire contents of the tank when the demand exceeds the rate of normal vaporization. In this type of construction, there is no particular problem during the summer months when the temperature of the surrounding air is relatively high. At such time the heat from the air surrounding the tank is usually enough to maintain the gas pressure in the tank at a sufficiently high level. Furthermore, even in those extreme instances when it is necessary to add additional heat to the liquid fuel, the temperature differential between the liquid in the tank and the surrounding air is so small there is very little heat loss from the contents of the tank to the air. However, during the winter months when heat must be added to the liquid fuel in the tank to maintain a sufficiently high pressure in it, there is a relatively large heat loss because of the increased temperature differential between the contents of the tank and the surrounding air which results in an increased heat transfer from the tank to the air.

It is an object of the present invention therefore, to provide a novel combination liquid fuel vaporizer and storage tank which will greatly minimize the amount of heat loss when the temperature differential between the contents of the tank and the surrounding air is relatively high, without radically changing the construction of existing units. More particularly, it is an object to provide such a device which will maintain an adequate supply of gas at all times with relatively low heat loss. Specifically, it is an object to provide such a device in which a small portion of liquid petroleum fuel within the tank is physically isolated from the main body of the liquid fuel by means of a partition, and means are provided for applying heat to only the isolated portion of the liquid fuel so as to maintain the gas pressure from the tank at a constant level. Another object is to provide a combination liquid fuel vaporizer and storage tank which is quickly responsive to changes in load demand so as to maintain the gas pressure substantially constant for all normal loads.

In one form, the device broadly comprises a container for fluids having a vertically extending partition therein dividing it into two compartments of unequal size. Relatively small opening means are provided in the partition adjacent the bottom of the container for fluid flow between the two compartments, and relatively large opening means are provided in the partition adjacent the top of the container to provide for gas flow between them. A heat source is associated with the smaller compartment for applying heat to the liquid fuel contained in it, the heat source being responsive to the pressure in the container so that as the pressure drops, more heat will be applied to the liquid in the smaller compartment.

If a gas burner is used as the heat source, it is preferably supplied with gas from the outlet of the container so that the unit is entirely self-sufficient.

In the drawing:

Fig. 1 is a vertical sectional view of a combination vaporizer and storage tank constructed in accordance with the teachings of the present invention, some of the parts being shown in full lines to better illustrate its construction. In this construction the heat is supplied to the isolated portion of the liquid by a fire tube which extends vertically through the smaller compartment.

Fig. 2 is a vertical sectional view of a slightly modified construction in which the heat is supplied to a coil through which the liquid in the isolated portion circulates; and, Fig. 3 is a vertical sectional view of another modification in which the heat is supplied to the isolated portion of the liquid by means of a coil disposed in the smaller compartment, and through which hot fluid such as steam is passed.

Referring to the drawing more particularly by reference numerals, specifically Fig. 1, 10 indicates generally a combination vaporizer and storage tank embodying the teachings of the present invention. It includes a tank 12 for containing a liquid petroleum fuel L and has a vertical side wall 14 and top and bottom end walls 16 and 18, respectively.

A partition 20 extends vertically between the top and bottom walls 16 and 18 so as to separate the interior of the tank into two compartments 22 and 24 of unequal size, the compartment 22 being the smaller of the two.

A series of small openings 26 are provided in the partition 20 adjacent the bottom of the tank 12 to permit the passage of liquid fuel L from compartment 24 to compartment 22. These openings may be small in size because the quantity of liquid which must flow from one compartment to the other is relatively small. Also, openings 28 are provided at the top of the partition 20 to provide means for the passing of vaporized fuel from compartment 22 into compartment 24. Passages 28 must be adequate to pass large volumes of fluid in the gaseous form.

Extending vertically through the smaller compartment 22 is a fire tube 30 which contains a plurality of spaced fins 32 to increase its heat-transfer surface. The upper end of the tube 30 extends through the top wall 16 and is bent at a right angle to prevent rain water and the like from entering the tube. The lower end of the tube 30 extends through the bottom wall 18 and has a funnel-like member 34 fastened to it.

Connected to the top of the tank 12 is an outlet pipe 36, and connected to the latter as a branch thereof is a fuel pipe 38 which extends downwardly to adjacent the bottom of the tank 12.

A main burner tube 40 for supplying a main burner 41 at the tip thereof, and a pilot burner tube 42 for supplying the pilot burner 43 are connected to the lower end of the fuel pipe 38 and extend toward the bottom of the tank 12.

A control valve 44 is provided in the main burner tube 40 and is connected to the fuel pipe 38 through a control tube 46 so that the valve 44 is directly responsive to the pressure in the fuel pipe 38 and indirectly responsive to the pressure in the outlet pipe 36 and the tank 12.

The main burner 41 is disposed immediately under the funnel-like member 34 so that the hot combustion gases from the flame are funnelled into the lower end of the fire tube 30.

Operation

During the summer months, and at other times during periods of low demand, the pressure in the tank 12 is usually maintained sufficiently high by normal vaporation caused by the heat from the air surrounding the tank.

However, during periods of high demand, and particularly during the winter months, heat must be added to the liquid from a source other than the surrounding air.

Assuming that the pressure in the tank 12 is sufficiently high so that the main burner 41 is not ignited and only the pilot burner 43 is in operation, a decrease in pressure in the tank below a predetermined amount will result in a decrease in pressure in the outlet pipe 36 and in the fuel pipe 38. This decrease in pressure is transmitted through the control tube 46 to the control valve 44 so as to cause the latter to open and admit gas to the main burner 41 where it is ignited by the pilot burner 43.

The hot combustion gases from the main burner 41 enter the funnel-like member 34 and pass upwardly through the fire tube 30, thereby increasing the temperature of the fire tube 30 and the fins 32.

The temperature of the liquid fuel in the smaller chamber 22, which has entered it through the openings 26 in the bottom of the petition 20, is thereby increased so as to increase the rate of vaporization in the compartment 22 and the gas produced above the liquid passes through the openings 28 and into the upper part of the tank 12.

When the gas pressure in the tank 12 and in the outlet pipe 36 has increased sufficiently, the control valve 44 is throttled to decrease the amount of heat being supplied to the liquid in the smaller compartment 22 so as to maintain a substantially constant pressure in the tank 12 and its outlet.

Since heat is applied only to the small body of liquid in compartment 22, the temperature of the liquid in the large comparment 24 remains substantially the same as that of the air surrounding the tank 12. Actually the upper surface of the liquid in compartment 24 is warmed by condensation of vapor produced in compartment 22, but little thermal circulation occurs and consequently, little elevation of temperature of the main body of liquid. The small body of warmed liquid has small areas of container surface through which to lose heat to the atmosphere, and the large volume of liquid, with its large areas of surrounding container surface which is at substantially the same temperature as the atmosphere, so that comparatively little heat is lost to the atmosphere from the tank 12.

It has been determined by actual tests that when heat is supplied to only the liquid in the smaller compartment 22, the amount of heat required to maintain a set pressure in the tank 12 is considerably less than the amount of heat necessary to maintain that same pressure when the heat is supplied to all of the liquid fuel in the tank 12.

Furthermore, when a device constructed in accordance with the teachings of the present invention is used, the response to variations in pressure in the outlet pipe 36 is much faster because the temperature of only a small portion of the liquid fuel must be increased as compared with increasing the temperature of all of the liquid the same amount.

The modified construction shown in Fig. 2 is very similar to the construction of Fig. 1, and like parts are identified by like numbers which have the digit 1 added to the front of them; thus, the tank 12 of Fig.1 becomes the tank 112 in Fig. 2.

The main difference between these two constructions resides in the heating means. In the device of Fig. 2, a heater coil 50 is provided outside of the tank 112 and contains open ends 52 and 54 which extends through the vertical side wall 114 and into the smaller compartment 122.

The main burner and pilot burner construction is the same as in Fig. 1 and the main burner 141 is disposed immediately below the lower end of the coil 50 so as to be in axial alignment with it. A jacket 56 is provided around the coil 50 and burners 141 and 143, to minimize the heat loss, and the jacket 56 contains a vent 58 at upper end thereof through which the products of combustion escape.

The device of Fig. 2 operates in substantially the same manner as the device of Fig. 1 in that the main burner 141 is ignited when the pressure in the top of the tank 112 and in the outlet pipe 136 drops below a predetermined amount, and thereafter the flow of gas to the main burner 141 is regulated by means of the valve 144 so as to maintain the pressure of the gas in the outlet pipe 136 within predetermined limits.

The colder liquid in the smaller compartment 122 drops toward the bottom of the tank 112 and enters the coil 50 through the lower end 54. Heat is added to the liquid in the coil 50 by means of the main burner flame so that the liquid rises and returns to the smaller compartment 122 through the open end 52. As in the construction shown in Fig. 1, the gas produced by vaporization of the liquid in the smaller compartment 122 passes through the openings 128 into the top of the compartment 124.

The modified construction of Fig. 3 is similar to the other two and the parts thereof which are the same as the parts in Fig. 1 are identified by the same numeral with the digit 2 added to the front of it; thus, the tank 12 of Fig. 1 becomes the tank 212 in Fig. 3.

In the construction of Fig. 3, a heating coil 60 is positioned in the smaller compartment 222 adjacent the bottom of the tank. The coil 60 contains two ends 62 and 64 which extend through the vertical side wall 214 and are adapted to be connected to an external source of heat such as a steam boiler.

The operation of this construction is somewhat similar to the operation of the devices of Fig. 1 and Fig. 2 in that when heat is added to the liquid fuel in the smaller compartment 222, as by means of hot fluid flowing through the coil 60, the liquid fuel is vaporized and the gas passes through the openings 228 into the upper end of the tank 212 and thence out through the outlet pipe 236.

Conventional control equipment (not shown) is used to regulate the amount of heat entering the coil 60 responsive to the pressure in the tank 212 so that this pressure is maintained within predetermined limits.

Thus, it is apparent that there has been provided a novel combination vaporizer and storage tank for liquid petroleum fuel which fulfills all of the objects and advantages sought therefor.

By heating only a small portion of the liquid in the storage tank, there is a picker response to demands for increased vaporization. Furthermore, because the heat is localized so that only a portion of the liquid is at an elevated temperature, the amount of heat lost to the surrounding air is greatly reduced when compared with the amount of heat loss when the entire body of liquid is heated.

It is to be understood that the foregoing description and the accompanying drawing have been given only by way of illustration and example, and that changes and alterations in the present disclosure, which will be readily apparent to one skilled in the art, are contemplated as within the scope of the present invention, which is limited only by the claims which follow.

What is claimed is:

1. A device of the type described, comprising a container for fluids; an upwardly extending partition in the container passing from the bottom to the top of said container and dividing it into at least two compartments of unequal size; passage means in said partition between the two compartments adjacent the bottom of the container to permit limited fluid flow between them; passage means in said partition between the two compartments adjacent the top of the container; a heat source associated with the compartment of lesser size for applying heat to a fluid contained therein, said heat source being adapted to utilize a portion of the fluid being stored; and means controlling the heat source responsive to the pressure at the top of the container.

2. A combination vaporizer and storage tank for liquid fuel, comprising a container; an upwardly extending partition within the container passing from the bottom to the top of the container and dividing it into two compartments of unequal size; relatively small opening means in the partition adjacent the bottom of the container to permit limited fluid flow between the two compartments; relatively large opening means in the partition adjacent the top of the container; an outlet pipe leading from the top of the container; a burner associated with the smaller compartment adjacent the bottom thereof and at least at as high an elevation as said relatively small opening in the partition for applying heat to a fluid contained therein; a conduit from the outlet pipe to the burner; and valve means in the conduit responsive to the gas pressure therein.

3. A combination vaporizer and storage tank for liquid fuel, comprising a container; an upwardly extending partition within the container passing from the bottom to the top of the container and dividing it into two compartments of unequal size; relatively small opening means in the partition adjacent the bottom of the container to permit limited fluid flow between the two compartments; relatively large opening means in the partition adjacent the top of the container; an outlet pipe leading from the top of the container; a burner associated with the smaller compartment adjacent the bottom thereof and at least at as high an elevation as said relatively small opening in the partition for applying heat to a fluid contained therein, said burner having means therewith for transferring heat to said smaller compartment from a point above the small opening upwardly therefrom; a conduit from the outlet pipe to the burner; and valve means in the conduit responsive to the gas pressure therein.

4. A combination vaporizer and storage tank for liquid fuel, comprising a container; an upwardly extending partition within the container passing from the bottom to the top of the container and dividing it into two compartments of unequal size; relatively small opening means in the partition adjacent the bottom of the container to permit limited fluid flow between the two compartments; relatively large opening means in the partition adjacent the top of the container; an outlet pipe leading from the top of the container; a burner associated with the smaller compartment adjacent the bottom thereof and at least at as high an elevation as said relatively small opening in the partition for applying heat to a fluid contained therein, said burner having heat transfer means for conducting the hot products of combustion into said smaller compartment adjacent the bottom and out at a higher elevation and for transferring the effective heat into said compartment from above said smaller opening upwardly therefrom; a conduit from the outlet pipe to the burner; and valve means in the conduit responsive to the gas pressure therein.

5. A combination vaporizer and storage tank for liquid fuel, comprising a container; an upwardly extending partition within the container passing from the bottom to the top of the container and dividing it into two compartments of unequal size; relatively small opening means in the partition adjacent the bottom of the container to permit limited fluid flow between the two compartments; relatively large opening means in the partition adjacent the top of the container; an outlet pipe leading from the top of the container; a burner associated with the smaller compartment adjacent the bottom thereof and at least at as high an elevation as said relatively small opening in the partition for applying heat to a fluid contained therein, said burner being situated exteriorly of said tank and being adapted to heat a coil having an inlet in communication with said lesser compartment above said smaller opening and an outlet in communication with said lesser compartment at a point spaced above said inlet.

6. A combination vaporizer and storage tank for liquid fuel, comprising a container; an upwardly extending partition within the container passing from the bottom to the top of the container and dividing it into two compartments of unequal size; relatively small opening means in the partion adjacent the bottom of the container to permit limited fluid flow between the two compartments; relatively large opening means in the partition adjacent the top of the container; an outlet pipe leading from the top of the container; a burner associated with the smaller compartment adjacent the bottom thereof and at least at as high an elevation as said relatively small opening in the partition for applying heat to a fluid contained therein, said burner having heat transfer means for conducting the hot products of combustion into said smaller compartment adjacent the bottom and out at the top thereof through a conduit, said heat transfer means further including a plurality of fins on said conduit spaced from one another above said smaller opening; a conduit from the outlet pipe to the burner; and valve means in the conduit responsive to the gas pressure therein.

7. A combination vaporizer and storage tank for liquid fuel, comprising a container having an upwardly extending partition for separating a liquid which may be contained therein into two separate bodies of unequal size and having the same surface level, passage means within said partition adjacent the bottom thereof for maintaining said separate bodies of liquids at the same level, a heat source associated with the smaller body of liquid for vaporizing the liquid comprising a burner, an outlet at the top of the container, means in the container for conducting vapors from both of said liquid bodies to said outlet, means for controlling the heat source responsive to the vapor pressure in said outlet including an outlet pipe connecting with said outlet, a conduit from the outlet pipe to the burner, and valve means in said conduit for controlling the flow of vapor to the conduit, said valve means being responsive to the vapor pressure in the conduit.

References Cited in the file of this patent
UNITED STATES PATENTS

| | | |
|---|---|---|
| 1,352,788 | Catron | Sept. 14, 1920 |
| 2,084,297 | Martin | June 15, 1937 |
| 2,217,581 | White | Oct. 8, 1940 |
| 2,252,261 | Jones | Aug. 12, 1941 |
| 2,255,747 | Jones | Sept. 16, 1941 |
| 2,256,591 | Grindle | Sept. 23, 1941 |
| 2,303,995 | Grindle | Dec. 1, 1942 |
| 2,341,380 | James | Feb. 8, 1944 |